Figure 1:
Figure 2:
Figure 3:
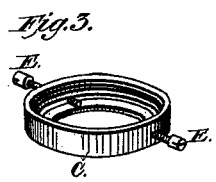

J. E. LAVEY.
Watchmaker's Lathe-Chuck.

No. 202,838. Patented April 23, 1878.

Attest:
J H Simons
S L Lavey

Inventor:
Joseph E. Lavey

UNITED STATES PATENT OFFICE.

JOSEPH E. LAVEY, OF HUNTINGTON COUNTY, INDIANA.

IMPROVEMENT IN WATCHMAKERS' LATHE-CHUCKS.

Specification forming part of Letters Patent No. 202,838, dated April 23, 1878; application filed June 29, 1877.

*To all whom it may concern:*

Be it known that I, JOSEPH E. LAVEY, in the county of Huntington and State of Indiana, have invented a new and useful Improvement in Watchmakers' Lathe-Chucks; and I do declare that the following is a full, clear, and exact description of the construction and operation of the same, reference being had to the annexed drawings, making a part of this specification.

B represents a disk, with an arm or shaft like those in use. Spiral threads or grooves are cut around the shaft. C represents a metallic cup, with spiral threads or grooves, corresponding in size with the threads or grooves of the shaft, with an opening in the center of the cup less in circumference than the shaft. D D represent jaws, which are half-circular shaped, with one side projecting, with half-holes cut in the center of each, which, when placed or fitted together, form an annular disk with a round or square hole in the center.

Jaws D D are placed into cup C, with the projecting side passing through the opening of cup C. The spiral threads or grooves on shaft B will then carry cup C back until the jaws D D are pressed firmly against the end of shaft.

E E represent two screws, which pass through the rim of cup C, resting on the jaws D D.

Wheels turned or worked upon have their axes caught in the hole of the jaws D D. The screws E E are then tightened upon the jaws D D, thereby firmly securing the work.

What I claim as my invention is—

The combination of the internally-threaded cup C, set-screws E, jaws D, and disk B, having the threaded extension, substantially as specified.

JOSEPH E. LAVEY.

Witnesses:
   J. H. SIMONS,
   S. S. LAVEY.